April 5, 1938.                J. T. EARLE                 2,113,174
                      CARRIAGE OR TRUCKING DEVICE
                         Filed Sept. 20, 1937
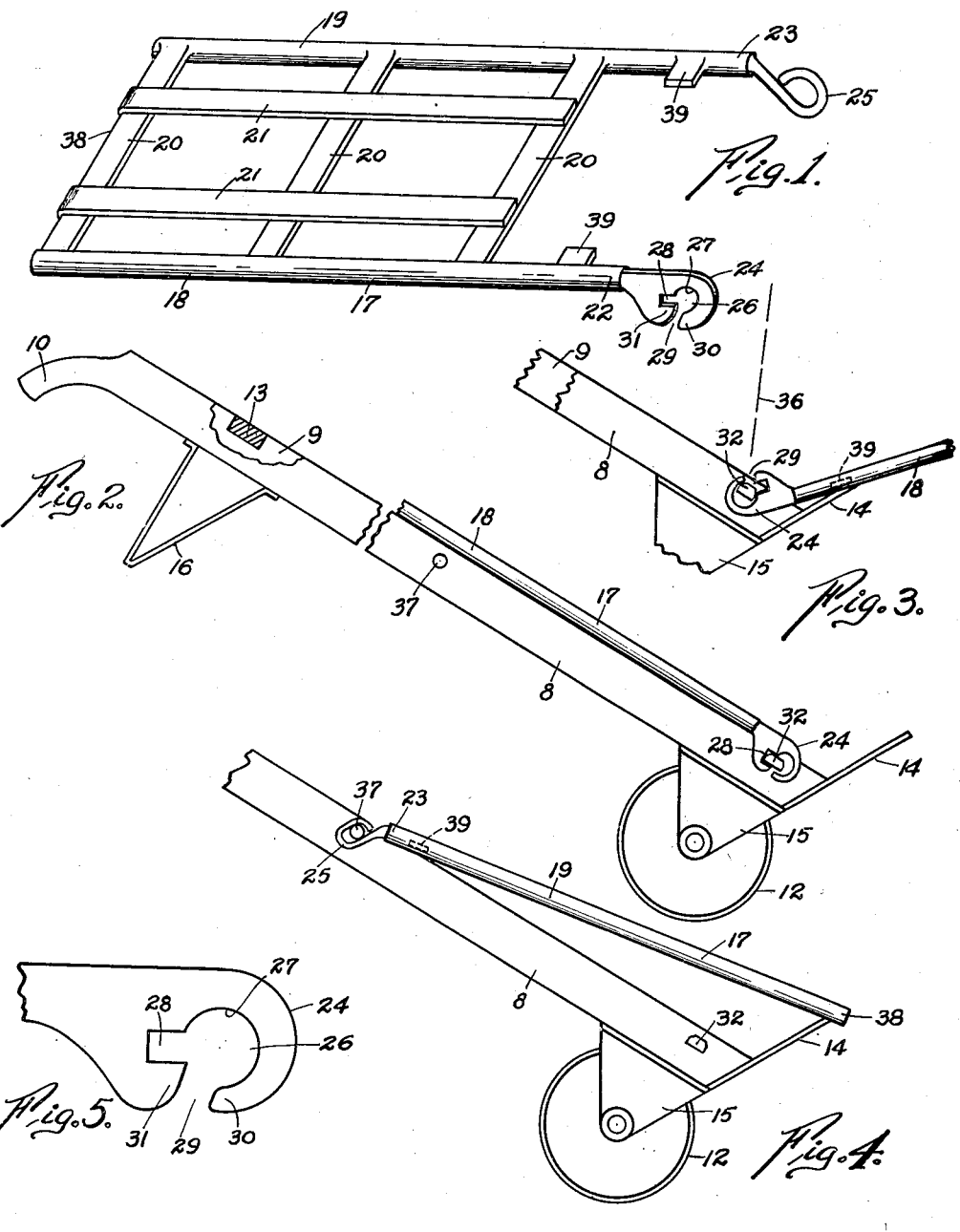
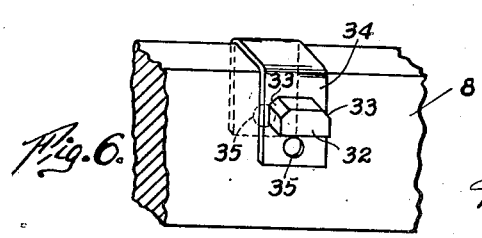
INVENTOR.
James T. Earle
BY Murray Sackhoff Zugelter & Paddack
ATTORNEYS.

Patented Apr. 5, 1938

2,113,174

UNITED STATES PATENT OFFICE 2,113,174

CARRIAGE OR TRUCKING DEVICE

James T. Earle, Cincinnati, Ohio

Application September 20, 1937, Serial No. 164,699

8 Claims. (Cl. 280—57)

This invention relates to improvements in carriages or trucking devices of the character employed in moving or handling freight and merchandise of all descriptions. Such devices may be wheeled, or in the form of sleds or skids, and the present invention is applicable to practically all forms of such devices generally.

An object of the invention is to provide a novel and improved form of coupling between a trucking device and a rack to be used in conjunction therewith.

Another object of the invention is to provide a rack and a trucking device embodying improved complementary coupling means, arranged to facilitate disposition of the rack to various operative positions at which accidental displacement of the rack cannot occur.

Another object of the invention is to provide a novel form of reversible rack for trucking devices or the like, which will function in the intended manner even though sprung out of shape through severe usage or abuse, this being accomplished by the provision of dissimilar coupling means at opposite sides of the rack.

A further object is to cheapen the construction, and simplify the manufacture and use of the kind of device herein referred to.

The foregoing and other objects are attained by the means described herein and disclosed in the accompanying drawing, in which:

Fig. 1 is a perspective view of a warehouse truck or like rack, embodying the present invention.

Fig. 2 is a side elevational view of a truck, part being broken away, and showing an application of the rack of Fig. 1.

Fig. 3 is a fragmental side elevational view showing the rack of Fig. 2 in an operative position other than the operative position of Fig. 2.

Fig. 4 is a view similar to Fig. 2 showing the rack placed upon the truck in a third operative, but reversed, position.

Fig. 5 is an enlarged fragmental side view of one coupling member of the rack.

Fig. 6 is a fragmental perspective view showing a coupling member for the truck rail, and one method of fixation thereto.

In transporting freight or merchandise over short distances by means of hand trucks and the like, it is oftentimes desirable to increase the capacity of the truck by providing means other than the usual blade or lifting piece for precluding shifting and displacement of the goods upon the truck. For this purpose, various kinds of racks or other attachments have been proposed, serving as an additional side or end for the truck. Some of the known racks are permanently attached to the truck, although pivoted thereon, and while such structures perform their intended function, they are nevertheless undesirable because of their permanent nature. The most serious objection to the permanently attached rack is that the laborer is required to lift and transport the added weight of the rack even though he may be at work in handling goods or merchandise which do not require the use of a rack, for long periods of time. For instance, in the loading and unloading of cars or trucks, the entire load or shipment may be of such a nature that the rack is not required at all. In such circumstances, it is desirable to use a hand truck having no auxiliary rack, and detachability of the rack in such cases is a desirable feature.

In the case of detachable racks, various objections have been noted also. One of the most serious objections is that of having the rack jump from the truck or become accidentally displaced when the wheels of the truck encounter an obstacle in their path. This condition has been noted especially while moving the hand truck over sills or gangplanks in an unloaded condition. Such rack displacement sometimes resulted in injury to workmen, and always in a waste of time necessary to recover and replace the rack upon the truck. It is therefore desirable that a rack for hand trucks be both detachable when not needed, and lockable in a position of safety when attached to the truck. It is moreover desirable to so lock or latch the rack relative to the truck body, as to enable instant application or removal with the expenditure of a minimum of time and effort. These considerations, among others, characterize the present invention.

With reference to the accompanying drawing, 8 and 9 indicate the opposed side rails of a hand truck having handles 10 and wheels 12 at opposite ends thereof. One or more transverse pieces 13 serve as spacers for the rails of the truck. At the lower or forward ends of the rails, there is usually provided an upwardly and forwardly extended blade or lifter 14, sometimes referred to as a lifting toe, and this part generally is fixed securely to the body of the truck. The characters 15 and 16 indicate, respectively, a bracket for mounting the truck wheels, and a support or rest which maintains the truck in a horizontal position while loading or unloading merchandise. As will be understood, the truck body is inclined while in use.

The truck above described is adapted to carry a rack indicated generally by the character 17, said rack comprising preferably a pair of side members 18 and 19 arranged in spaced parallelism and connected by means of a supporting area comprising a series of transverse struts 20 and longitudinal straps or members 21. The entire assembly is made into a unitary structure in any suitable manner, such as by welding, riveting, or brazing the parts to one another.

At the free forward ends 22 and 23 of the side pieces of the rack, are mounted a pair of dissimilar coupling members 24 and 25, which furnish a novel form of pivotal mounting for the rack upon the truck body. The coupling member 25 preferably is in the form of a plain elongated loop which is extended forwardly and downwardly from the end 23 of side piece 19. The coupling member 24, however, is in the form of a claw fabricated from a piece of flat but thick metal, and this claw is likewise permanently attached to the free end 22 of side piece 18. It will be noted that coupling member 24 is provided with an aperture 26 which is of keyhole shape, having a substantially circular portion 27 and a contiguous communicating slot 28 which extends rearwardly and in substantial parallelism with the axis of side piece 18. From the periphery of the claw, at the under side thereof, there is provided a passageway or side opening 29 which enters the circular portion of the aperture 26 at a location near the notch 28. This construction results in the provision of front and rear hooks 30 and 31 respectively, at the under part of the claw. In the present embodiment, the medial line of passageway 29 which passes through the center of the circular opening 27, is at approximately sixty degrees angularity to the axis of side piece 18. As will be understood, however, the angularity of the passageway may be varied depending upon the angle at which the rack is to be released when removing it bodily from the hand truck, as will hereinafter appear.

For mounting the rack upon the truck, there is provided a complementary coupling member 32 which is fixed upon the truck body, and preferably upon the side rail thereof so as to extend outwardly in the vicinity of the blade or lifter. Said coupling member 32 is stationary, and in the preferred form it is, in cross-section, of a generally rectangular shape, with its uppermost corners chamfered as at 33. As shown, the major axis of the coupling member or stud 32 extends in parallelism with the side rail 8 of the truck body. It is to be understood that a coupling member or stud such as 32 is fitted upon each of the side rails 8 and 9 of the truck body.

The coupling member 32 may be applied to a rail such as 8 or 9 in any suitable manner, for example, it may be welded, riveted, or otherwise secured to a strap 34 bent into U shape so as to fit over the rail 8 (see Fig. 6), the free ends of the strap being perforated as at 35 to receive a bolt, rivet or the like which extends through the material of the truck rail.

In Fig. 3, the rack is shown applied to the truck, as extended forwardly and upwardly against the blade or lifter 14, this being the operative position of the rack when the truck is used for transporting bulky objects. In the operative position of Fig. 3, it should be noted, the rack may not be lifted or detached from the truck body. However, by moving the rack about the stud 32 rearwardly and to the position indicated by the broken line 36, the passageway 29 of claw 24 will register with the stud or stationary coupling member 32 so as to permit disassociation of the claw from the stud 32. By thus releasing the claw, it is a simple matter to disconnect the loop 25 at the opposite side of the rack, from the extended stud of the opposite truck rail 9.

In the relationship disclosed in Fig. 2, wherein the rack is resting flatly upon the body of the truck, the rack likewise is not detachable from the truck body. Moreover, when the truck body is inclined as shown, the rack shifts or gravitates forwardly by its own weight, to dispose the upper and lower flat faces of stud 32 within the notch 28 of the claw. With the stud thusly disposed within the notch, it is impossible to rotate the rack about the stud, and accordingly the rack cannot bounce or become displaced when the wheels of the truck strike obstructions on the surface over which the truck is being operated. Otherwise stated, the rack automatically shifts to a position at which it is latched against rotation relative to the stud or coupling member 32, the moment that the workmen lifts and inclines the truck body. Although the rack is securely latched when disposed in the Fig. 2 position, the operator need only retract the rack a slight distance toward the handle 10 in order to disable the latching connection between the stud 32 and notch 28, whereupon the rack may be swung to either of the positions indicated in Fig. 3. It is of importance to note that the latching, unlatching and rack detaching functions occur only at one side of the rack, that is, the side which carries the claw 24; the loop 25 at the opposite side of the rack offers no resistance whatever to the arcuate movement of the rack. Thus it will be appreciated that accidental bending or distortion of the coupling members 24 and 25 relative to one another, cannot result in inability of the couplings to register with one another, nor will any normal distortion of the entire rack interfere with the coupling thereof to the hand truck body.

Fig. 4 illustrates the use of the rack upon the truck body in a reversed position in which the loop 25 engages a stud or projection 37 located upon the side rail 8 at a location intermediate the ends of the rail. In this position of the rack, the rear end 38 thereof rests upon the top of the blade or lifter, while the inwardly directed stops or abutments 39 rest upon the opposed side rails of the truck body. In this position of the rack, large pieces of furniture or flat objects may be transported without being injured or penetrated by the blade or lifting piece 14. It should be understood that the extensions or abutments 39 would be just as effectively established by extending them toward one another so as to completely span the space between the rack side members 17 and 19. The disposition of loop 25 over the stud or projection 37 prevents longitudinal shifting of the rack when used in accordance with the Fig. 4 disclosure.

It may here be noted that the thickness of the coupling member or stud 32 is but slightly less than the width of the notch 28, and of the passageway 29, and that the diameter of the circular portion 27 and the claw aperture is but slightly greater than the length of the stud, the length being considered the distance between the shorter sides which bound the outer vertical face or end of the stud. The chamfered areas 33 induce a smooth and easy rotational movement of the rack about the stud 32, as will be evident upon reference to Fig. 3.

From the foregoing it will readily be evident that the structure herein described and illustrated provides for extreme safety, and quick and easy disposition of an auxiliary rack to a fully latched inoperative position, and to a semi-latched operative position at which the rack may not accidentally be displaced. Moreover, the latching in the inoperative position of the rack occurs automatically when the handles of the truck are lifted, while at the same time the latching function may be disabled by means of a simple shifting of the rack toward the truck handles. It is to be understood that the device of the invention may be associated with various types of trucks and carriers, including sleds, and that various modifications and changes in the structural details may be made therein, within the scope of the appended claims, without departing from the spirit of the invention.

What is claimed is:

1. The combination with a generally oblong coupling stud member on a truck body, of a detachable rack having a forward end including a claw apertured in the form of a keyhole, with a circular portion of diameter sufficient to receive said coupling stud member and with a side opening through which the stud member may be passed toward and from said circular portion when the faces determining the stud thickness register with said side opening, the constricted portion of the keyhole aperture being of a width to snugly receive opposed faces of the stud member for precluding rotation of the claw about the stud member, and means on the rack in the form of a loop opposite to the claw for loosely engaging a second coupling stud of the truck body.

2. In combination, a truck body comprising a longitudinal rail having a wheel at one end and a handle at the opposite end whereby the truck body may be inclined and moved over a surface in the inclined condition, a rack pivoted near the wheeled end of the body, for movement to and from parallelism with the body, and means at the pivot comprising a latch engaged by gravitation of the rack flatwise along and toward the wheeled end of the body when inclined, to latch the rack against accidental pivotal movement and retain it in flatwise relationship to the truck body so long as the truck body is inclined.

3. In combination, a truck body comprising a longitudinal rail and a coupling pivot member near one end of the rail, a detachable rack having a forward end and a complementary coupling member on the rack near said forward end, said coupling members engaging to pivot and preclude disassociation of the rack from the truck body in a majority of positions of the rack relative to the truck body, and means associated with the coupling members to permit longitudinal shifting of the rack to latch and unlatch the rack while it rests upon the truck body in substantial parallelism therewith, thereby to preclude pivotal displacement of the rack from said position of substantial parallelism with the truck body when shifted longitudinally to the latched position.

4. A detachable rack for hand trucks and the like, comprising a supporting surface and a pair of side members each having a forward free end, a pivot claw on the free end of one of the side members and including a latch portion to hold the rack in a latched position upon a truck, and a plain loop on the free end of the other side member, opposite to the claw, for engaging a pivot stud of the truck without restraining pivotal movement of the rack.

5. A detachable rack of the character described, comprising a supporting surface and a pair of side members each having a forward free end, a plain loop at one of said free ends, and a claw at the other free end, said claw being apertured in the form of a keyhole with a substantially circular portion having a notch extending therefrom, and a passageway extending from the periphery of the claw to the circular portion of the keyhole aperture, said passageway being of substantially the same width as said notch.

6. A detachable rack of the character described, comprising a supporting surface and a pair of side members each having a forward free end, a plain loop at one of said free ends, and a claw at the other free end, said claw being apertured in the form of a keyhole with a substantially circular portion having a notch extending therefrom, and a passageway extending from the periphery of the claw to the circular portion of the keyhole aperture, said passageway being of substantially the same width as said notch, and contiguous thereto.

7. A rack of the class described, comprising a supporting surface and a pair of side members each having a forward free end, an elongated loop at one of said free ends, and a claw plate at the other free end, said claw plate being substantially flat and having formed therein a substantially circular aperture and a contiguous communicating notch extending from the circular aperture rearwardly in substantially the direction of extension of the side members, and a passageway of approximately the same width as the notch, forming an entrance to the circular aperture from the periphery of the claw plate.

8. In combination, a hand truck body comprising a longitudinal rail having a wheel at one end and a handle at the opposite end whereby the truck body may be inclined and moved over a surface in the inclined condition, a rack pivoted near the wheeled end of the body, for movement to and from parallelism with the body and for limited shiftability in parallelism with the body, and means comprising a latch engaged by gravitation of the rack flatwise along and toward the wheeled end of the body when said body is inclined by means of the handle, to latch the rack against accidental pivotal displacement so long as the truck body is so inclined, the latch being disengaged by shifting the rack in the opposite direction.

JAMES T. EARLE.